United States Patent [19]
Freeland

[11] Patent Number: 5,964,204
[45] Date of Patent: Oct. 12, 1999

[54] FUEL VAPOR MANAGEMENT SYSTEM

[75] Inventor: Mark Freeland, Farmington Hills, Mich.

[73] Assignee: Ford Global Technologies, Inc., Dearborn, Mich.

[21] Appl. No.: 09/053,801

[22] Filed: Apr. 2, 1998

[51] Int. Cl.$^6$ .......................... F02M 37/04; F02M 15/00
[52] U.S. Cl. .......................... 123/516; 141/82; 220/905; 123/541
[58] Field of Search .................. 123/516, 518, 123/519, 520, 541, 41.31; 141/82, 59; 220/560.06, 560.07, 562, 905, 4.14

[56] References Cited

U.S. PATENT DOCUMENTS

| | | |
|---|---|---|
| 3,595,423 | 7/1971 | Yamamoto ............................ 220/4.14 |
| 3,994,322 | 11/1976 | Overall . |
| 4,122,968 | 10/1978 | Germain . |
| 4,304,206 | 12/1981 | Hall . |
| 4,865,004 | 9/1989 | Widmer et al. ...................... 123/541 |
| 4,870,828 | 10/1989 | Hidaka ................................. 123/541 |
| 5,020,687 | 6/1991 | Seizert ................................. 220/905 |
| 5,054,453 | 10/1991 | Onufer ................................. 123/516 |
| 5,255,735 | 10/1993 | Raghava et al. . |
| 5,415,196 | 5/1995 | Bryant et al. ......................... 141/82 |
| 5,606,954 | 3/1997 | Yamazaki et al. .................... 123/516 |
| 5,636,668 | 6/1997 | Thompson . |
| 5,669,361 | 9/1997 | Weissinger et al. . |
| 5,687,778 | 11/1997 | Harris . |

*Primary Examiner*—Thomas N. Moulis
*Attorney, Agent, or Firm*—Jerome R. Drouillard

[57] ABSTRACT

A fuel vapor emission control system for an automobile includes a fuel filler pipe, a filler cap, a check valve, a fuel tank, a carbon canister or other vapor storage device, a reservoir, and a vapor tube for conducting fuel vapor from one or more tank vent valves located on the fuel tank. The system reduces the amount of vapor mass which exits the fuel tank to the carbon canister by condensing some of the vapor sent to the canister during refueling. Fuel entering the filler pipe is used as a condensing agent. The system also reduces the amount of vapor pumped to the vapor storage device during diurnal cycles by permitting the volume of the fuel tank to change in response to changes in pressure within the tank.

6 Claims, 2 Drawing Sheets

FUEL VAPOR MANAGEMENT SYSTEM

BACKGROUND OF THE INVENTION

Field of the Invention

This invention relates to the field of reducing the amount of fuel vapor emitted from a vehicle fuel system. More specifically, the present invention relates to condensing fuel from a fuel vapor mixture and returning the condensate to the fuel tank. The present invention also relates to reducing the amount of fuel vapor emitted during vehicle diurnal cycles.

Disclosure Information

Fuel vapors generated in the fuel tank are managed by the vehicle evaporative control system. The evaporative control system is designed to provide for the consumption and storage of vapors. Vapors are typically conveyed to the engine inlet manifold for consumption when the engine is operating and to the evaporative emissions carbon canister for temporary storage when the engine is not operational. As maximum allowed emissions standards for unburned hydrocarbons decrease, vapor storage canisters have become larger to accommodate a greater amount of vapor. Optimum system design seeks to minimize the canister volume by protecting against fuel tank vapor generation transients along with aggressive engine purging strategies.

The storage requirements of the evaporative control system require large volume canisters with the capability to store the fuel vapors that are generated when the engine is not running. Two vapor generation transients contribute the majority of the vapor delivered to the canister.

The first transient occurs during diurnal cycles. Diurnal cycles produce hydrocarbon evaporative emissions resulting from the daily cycling of ambient temperatures on the vehicle system, also known as breathing losses. Vapors produced during diurnal heating are directed into the carbon canister. During the diurnal cooling, air is drawn into the evaporative emissions system through the atmospheric vent on the carbon canister in order to offset the vapor volume reduction in the fuel tank and prevent a partial vacuum.

The second major transient occurs during the refueling process. Vapors displaced by the incoming liquid are directed into the canister using the induced pressure in the fuel tank. Design considerations for refueling encourage minimization of the distance between the canister and the fuel tank. Therefore, most canisters are packaged on the underbody near the vehicle fuel tank.

The use of devices to condense fuel vapors during refueling is not new. U.S. Pat. No. 5,636,668, to Thompson, which is assigned to the assignee of the present invention, discloses a vapor recovery system which cools fuel entering the filler pipe of a vehicle using a heat exchanger powered by the vehicle's electrical system.

U.S. Pat. No. 5,255,735, to Rahava et al, describes an in-tank fuel vapor condenser in combination with a electric cooler to main the condensate in a liquid state. Such condensers are undesirable because of the additional electrical power requirements.

U.S. Pat. No. 4,304,206, to Hall, discloses a fuel vapor ventilation system with a fuel condensate trap located between the fuel tank and the canister. Unlike the evaporative control system in the present invention, which uses the cooler temperature of the fuel entering the tank for heat exchange, the Hall patent relies on condensation generation from natural exposure of the fuel vapor to ambient temperature between the fuel tank and the canister.

It is an object of the present invention to provide a simple and inexpensive method of reducing the amount of vapor mass emitted from an automobile fuel tank.

It is an advantage of the present invention that fuel vapor will be condensed during vehicle refueling without an electrical or externally powered device.

It is a further advantage of the present invention that the mass of fuel vapor pumped to the canister will be reduced during diurnal cycles.

Other features, objects and advantages of the present invention will become apparent to the reader of this specification.

SUMMARY OF THE INVENTION

A fuel vapor emission control system for an automobile, according to the present invention, includes a filler pipe mounted between a fuel entry port and a fuel tank inlet; a filler cap; a fuel tank which receives fuel from the filler pipe; and a vapor tube for conducting fuel vapor from one or more tank rollover vent valves located on a wall of the fuel tank, with said vapor tube passing through (or in thermal contact with) the fuel filler pipe, such that fuel entering the fuel tank through the filler pipe impinges upon the vapor tube and absorbs heat from fuel vapor flowing within the vapor tube.

The present system further includes a reservoir connected with the vapor tube for collecting condensed fuel, with said reservoir further comprising a return line for returning said condensate to said fuel tank and a feed line extending between the vapor tube and an onboard refueling vapor recovery (ORVR) carbon canister, with the feed line conveying uncondensed displaced vapor to the carbon canister.

The invention also includes a method for reducing the amount of fuel vapor entering an ORVR carbon canister during vehicle refueling, including the steps of passing relatively cooler fuel from a fuel storage tank over a condenser located in a fuel filler pipe operatively connected with a vehicle fuel tank; passing vapor displaced by fuel entering the fuel tank through said condenser, condensing liquid fuel from said vapor; collecting condensed liquid fuel in a reservoir; and returning said liquid fuel from said reservoir to the fuel tank.

The invention also includes a second method for reducing the amount of fuel vapor discharged by an automotive fuel tank during a twenty-four hour diurnal heating and cooling cycle, including the steps of, during a first heating portion of the cycle, allowing fuel vapor to pass through a rollover vent valve in the fuel tank and then through a check valve and into a vapor storage canister; during a first cooling portion of the cycle, allowing the check valve to close in response to a lowering of vapor pressure within the tank as the temperature is reduced thereby creating a partial vacuum in the fuel tank; reducing the volume of the fuel tank in response to said vacuum; and preventing the release of fuel vapor during a subsequent heating portion of the cycle, unless the fuel tank temperature exceeds the temperature of the first heating portion, by permitting fuel vapor to expand the volume of the fuel tank.

The present invention reduces the volume required for vapor storage by reducing the mass of vapor emitted from the fuel tank. Reducing the volume of the vapor storage canister reduces vehicle cost and improves packaging.

BRIEF DESCRIPTION OF THE DRAWINGS

The presently preferred embodiment of the invention is disclosed in the following description and in the accompanying drawings, wherein.

DETAILED DESCRIPTION OF PREFERRED EMBODIMENT

Figure 1:
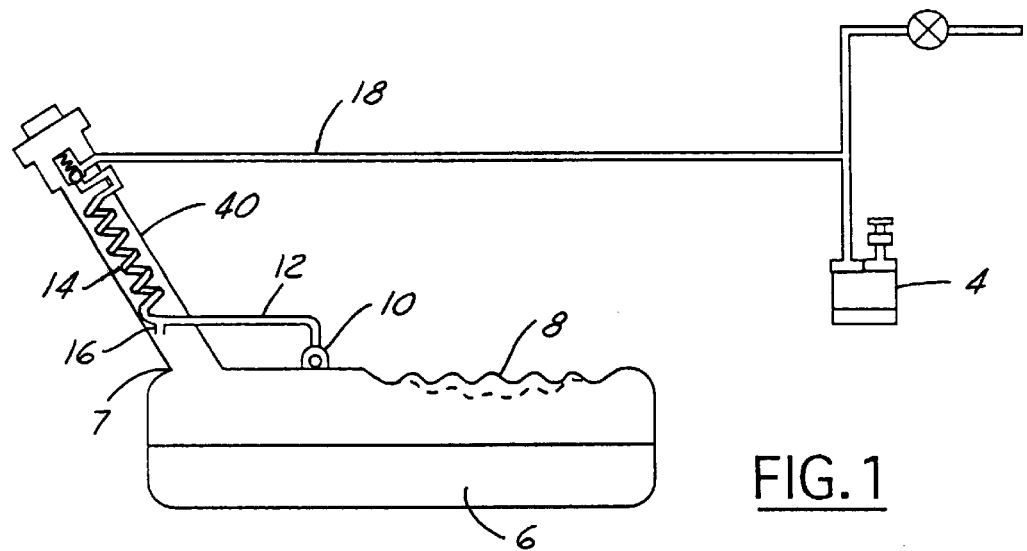
FIG. 1 is a partial schematic of an evaporative control system assembly according to the present invention.
Figure 2:
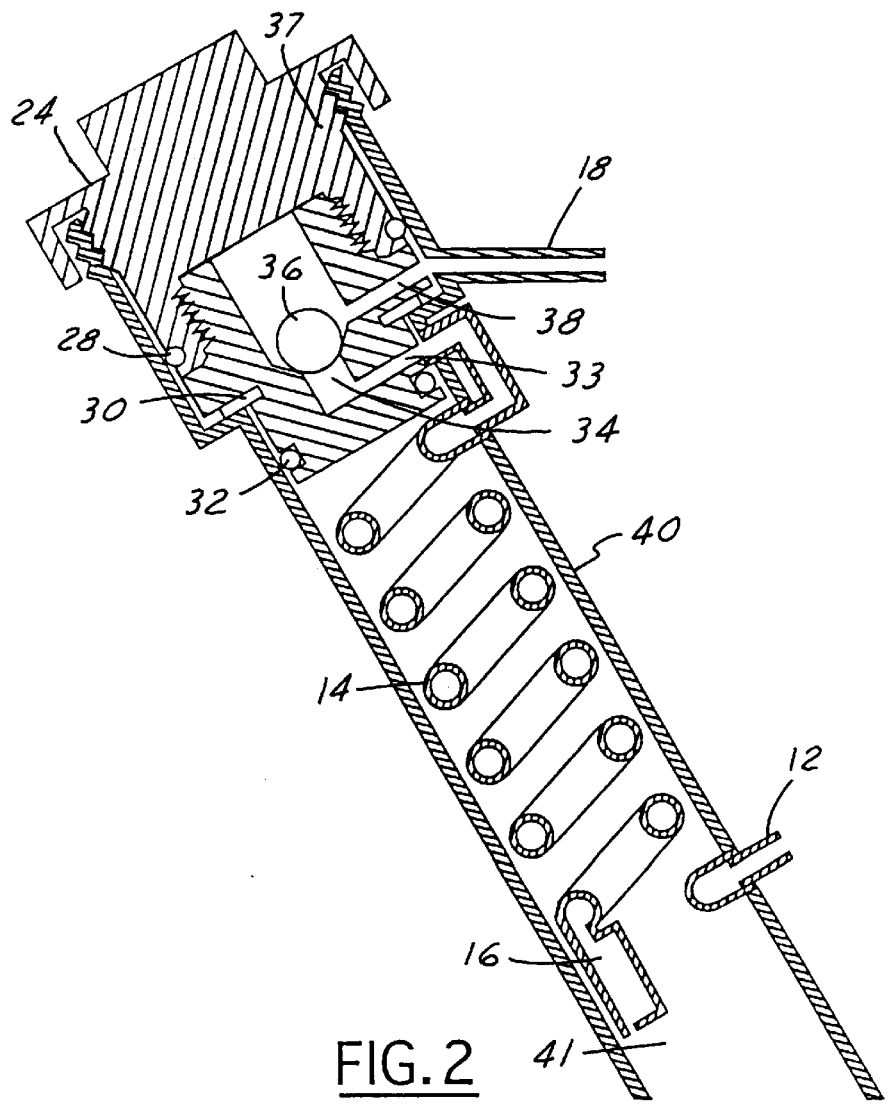
FIG. 2 is a sectional representation of vapor tube located in a filler pipe and connected to a filler cap check valve according to the present invention.

Referring to FIG. 1, an evaporative control system, according to the present invention, includes fuel tank 6 with flexible portion 8 in one of the walls. Vapor tube 12 exits tank 6 from rollover vent valve 10 and passes through filler pipe 40. As illustrated in FIG. 2, vapor condensing tube 14 is connected to a port 33 which aligns with the inlet of check valve 34 which is located in filler cap 24. The exit from the check valve 38 is connected to feed line 18 which is connected to evaporative emissions canister 4 (FIG. 1) and the engine in conventional fashion. As used herein, "evaporative emissions carbon canister" means a regular running loss vapor canister as well as an onboard vapor recovery ORVR) canister. Those skilled in the art will appreciate that such canister may include either carbons or other hydrocarbon adsorbing/desorbing agents.

Filler pipe 40 houses vapor condensing tube 14, generally between the inlet to the check valve in the filler cap 34 and vapor line 12 from rollover valve 10. Vapor condensing tube 14 is oriented in filler pipe 40 to facilitate heat exchange between the fuel being dispensed into filler pipe 40 as it flows from filler pipe inlet 37 to filler pipe outlet 41 and fuel tank 6. Vapor condensing tube 14 is preferably shaped to maximize heat exchange as the entering fuel impinges upon vapor condensing tube 14.

During refueling, when filler cap 24 is removed and fuel is pumped into filler pipe 40, vapor will be displaced from tank 6 and pass through rollover valve 10 and through vapor condensing tube 14 in filler pipe 40. Usually, fuel enters filler pipe 40 from an underground storage tank at a much lower temperature than the fuel vapor in tank 6. The cold fuel entering filler pipe inlet 39 will impinge on the walls of the vapor condensing tube 14, thus cooling and condensing some of the fuel vapor leaving rollover vent valve 10. This cooling of the fuel vapor reduces its volatility and causes fuel vapors emitted from fuel tank 6 to be condensed as the cooler liquid passes through filler pipe 40. The portion of the fuel vapor which condenses will enter reservoir drain 16 and reenter filler pipe 40 returning into fuel tank 6 as liquid fuel. The portion of fuel vapor which does not condense will continue through vapor condensing tube 14, through check valve 36, and enter canister feed line 18 which connects to carbon canister 4 in conventional fashion. The present invention will reduce the amount of fuel vapor which the carbon canister 4 would be required to store as the result of a refueling event.

During a series of diurnal cycles, the vapor in fuel tank 6 is repeatedly heated and cooled, thus causing expansion and contraction of the vapor. During an initial heating cycle, fuel vapor will be forced through rollover vent valve 10, through vapor tube 12, through condensing tube 14 and check valve 34 in filler cap 24, and into carbon canister 4. When fuel vapor in tank 6 experiences a cooling cycle, the check valve 36 will prevent air from being drawn into the system and will cause a partial vacuum to exist in tank 6. This partial vacuum will cause flexible portion 8 of tank 6 to deform, thus reducing the magnitude of the vacuum and the volume of the fuel tank. Flexible portion 8 is a substantial portion of one wall of the tank 6 and is integrated into the wall. One embodiment in a plastic tank might consist of a corrugated diaphragm molded into one wall. When the fuel vapor begins another heating cycle, fuel tank 6 will again expand and allow flexible portion 8 of tank 6 to return to its original shape and volume. Fuel tank 6 will not vent any fuel vapor to carbon canister 4 during this heating cycle unless the temperature exceeds the temperature achieved during the initial heating cycle. Thus, the cumulative volume of fuel vapor which exits the fuel tank 6 over several diurnal cycles will be significantly reduced.

FIG. 3 is a sectional representation of the condensing vapor tube 14 and filler cap 24 and demonstrates a sequential embodiment of a portion of a system according to the present invention during removal of filler cap 24 and check valve 36 from the filler pipe 40. The present invention uses check valve 36, to control pressure differentials within the system. During removal of filler cap 24, pressure differentials must be dissipated to prevent fuel from rapidly exiting filler pipe 40. FIG. 3a illustrates the system with filler cap 24 in fully closed position and internal pressure is greater than atmospheric pressure. Referring now to FIG. 3b, as filler cap 24 is removed, the check valve 36 is moved out of the way and face seal 30 moves away from seat 31 allowing vapors to pass between the vapor condensing tube 14 and feed line 18, thus equalizing the pressure between vapor tube 14 and feed line 18.

Figure 3A:
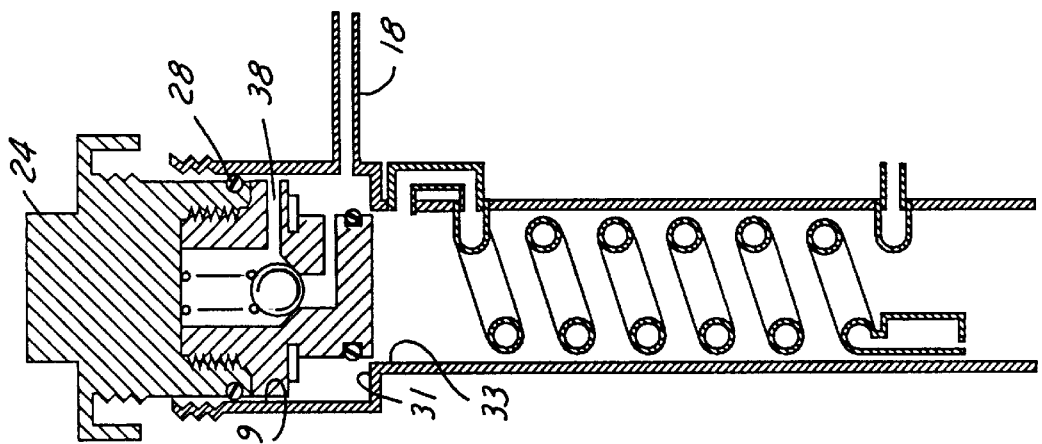
FIG. 3 is similar to FIG. 2., but shows the sequential removal of the filler cap with built-in check valve.
Figure 3B:
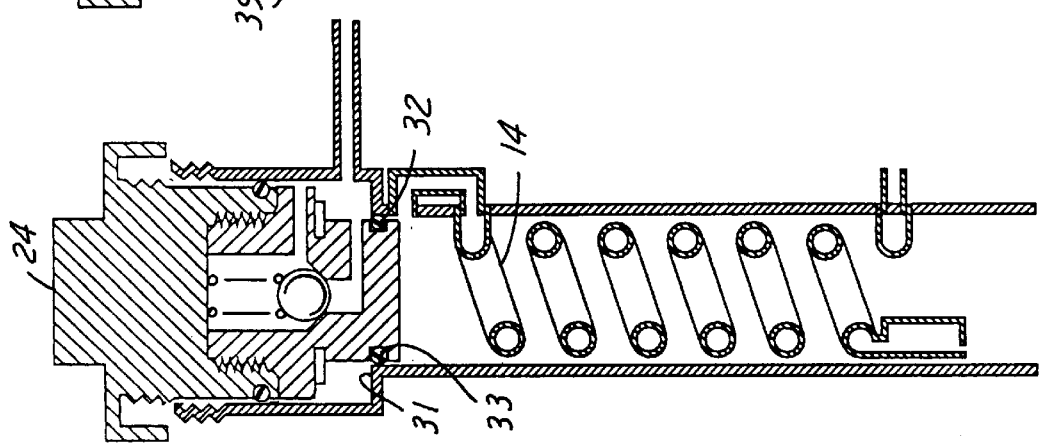
Figure 3C:
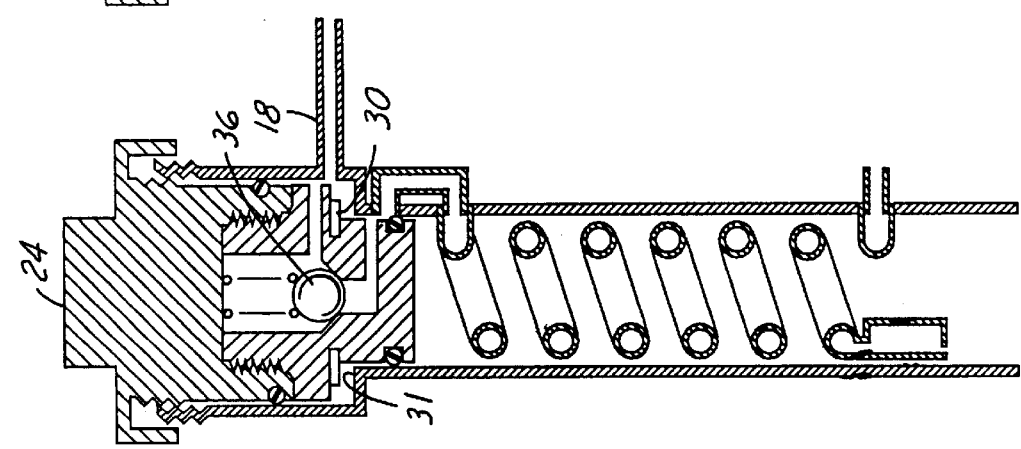
Figure 3D:
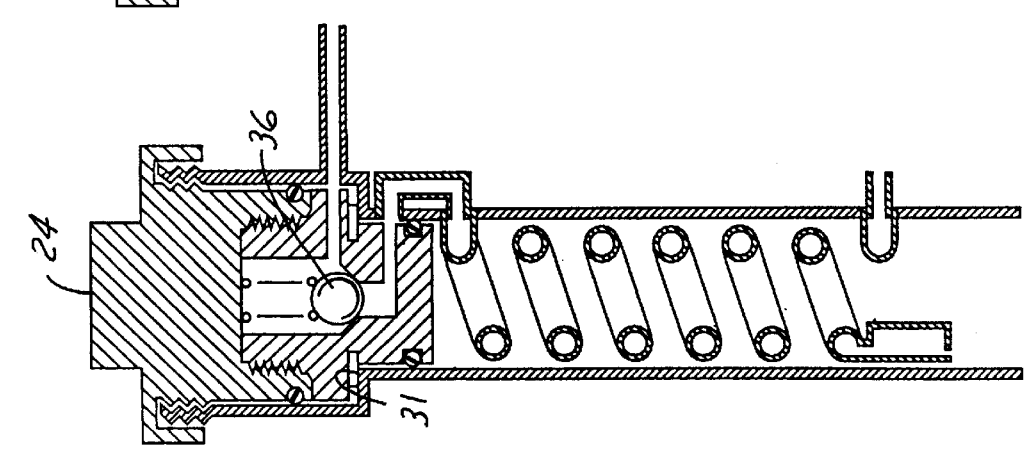

Referring now to FIG. 3c, as filler cap 24 is further removed, O-ring seal 32 moves away from seat 33 and allows the pressure to be equalized between vapor condensing tube 14 and filler pipe 40. Referring now to FIG. 3d, as filler cap 24 is further removed, O-ring 28, located above check valve exit 38, will move away from seat 39 after the pressure has been dissipated and equalized to external atmosphere.

The above description is of a preferred embodiment of the present invention which is intended to provide an enabling description of the present invention. The broad scope of the present invention should be construed by reference to the following claims.

I claim:

1. A fuel vapor emission control system for an automotive vehicle, comprising:

a filler pipe mounted between a fuel entry port and a fuel tank inlet;

a filler cap which seals the fuel entry port during nonfueling operation;

a fuel tank which receives fuel from filler pipe outlet;

a vapor tube for conducting fuel vapor from one or more tank vent valves located on an upper wall of the fuel tank, with said vapor tube passing through (in thermal contact with) the fuel filler pipe such that fuel entering the fuel tank through the filler pipe impinges upon the vapor tube and absorbs heat from vapor flowing within the vapor tube, with said vapor tube being further connected to an evaporative emissions control canister;

a reservoir connected with said vapor tube, for collecting condensed fuel from said vapor tube, with said reservoir further comprising a return line for returning said condensate to said fuel tank; and a feed line extending between the vapor tube and an onboard refueling vapor recovery carbon canister, with said feed line conveying uncondensed displaced vapor to the canister.

2. A fuel vapor emission control system according to claim 1, further comprising a check valve, housed in said filler cap, for controlling the flow of uncondensed vapor through the feed line.

3. A fuel vapor emission control system according to claim 1, wherein said fuel tank has a variable volume wall which permits the volume of the tank to change in response to changes in pressure within the tank.

4. A fuel vapor emission control system according to claim 3, wherein said variable volume wall comprises at least one flexible panel.

5. A method for reducing the amount of fuel vapor entering an ORVR canister during vehicle refueling, comprising the steps of:

passing relatively cooler fuel from a fuel storage tank, over a condenser located in a fuel filler pipe operatively connected with a vehicle fuel tank;

passing vapor displaced by fuel entering the fuel tank through said condenser;

condensing liquid fuel from said vapor;

collecting condensed liquid fuel in a reservoir; and returning said liquid fuel from said reservoir to the fuel tank.

6. A method for reducing the amount of fuel vapor discharged by an automotive fuel tank during a diurnal heating and cooling cycle, comprising the steps of:

during a first heating portion of the cycle, allowing fuel vapor to pass through a vent in the tank and then through a check valve and into a vapor storage canister;

during a first cooling portion of the cycle, allowing the check valve to close in response to a lowering of vapor pressure within the tank as the temperature is reduced thereby creating a partial vacuum in the fuel tank;

reducing the volume of the fuel tank in response to said vacuum; and preventing the release of fuel vapor during a subsequent heating portion of the cycle, unless the fuel tank temperature exceeds the temperature of the first heating portion, by permitting fuel vapor to expand the volume of the fuel tank.

\* \* \* \* \*